(12) United States Patent
Lee et al.

(10) Patent No.: US 9,411,188 B2
(45) Date of Patent: Aug. 9, 2016

(54) LIQUID CRYSTAL DISPLAY

(71) Applicant: Samsung Display Co., Ltd., Yongin, Gyeonggi-Do (KR)

(72) Inventors: Eung Gyu Lee, Cheonan-si (KR); Jin Suek Kim, Daejeon (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/736,124

(22) Filed: Jun. 10, 2015

(65) Prior Publication Data

US 2016/0202538 A1 Jul. 14, 2016

(30) Foreign Application Priority Data

Jan. 8, 2015 (KR) ........................ 10-2015-0002979

(51) Int. Cl.
*G02F 1/1333* (2006.01)
*H01L 27/12* (2006.01)
*G02F 1/1368* (2006.01)
*G02F 1/1362* (2006.01)
*G02F 1/1335* (2006.01)
*G02F 1/1339* (2006.01)

(52) U.S. Cl.
CPC ........ *G02F 1/133345* (2013.01); *G02F 1/1368* (2013.01); *G02F 1/13394* (2013.01); *G02F 1/133512* (2013.01); *G02F 1/136259* (2013.01); *G02F 1/136286* (2013.01); *H01L 27/1244* (2013.01); *H01L 27/1248* (2013.01); *G02F 2001/133357* (2013.01)

(58) Field of Classification Search
None
See application file for complete search history.

(56) References Cited

U.S. PATENT DOCUMENTS

| 2002/0159016 | A1* | 10/2002 | Nishida | G02F 1/134363 349/141 |
| 2004/0070718 | A1* | 4/2004 | Saigo | G02F 1/136227 349/141 |
| 2004/0135501 | A1* | 7/2004 | Nishikawa | H01L 27/3244 313/506 |
| 2006/0119756 | A1* | 6/2006 | Shin | G02F 1/13624 349/38 |
| 2007/0195250 | A1* | 8/2007 | Onogi | G02F 1/134363 349/141 |
| 2014/0118666 | A1 | 5/2014 | Lee et al. | |

FOREIGN PATENT DOCUMENTS

| KR | 10-2002-0013307 | 2/2002 |
| KR | 10-2004-0046140 | 6/2004 |
| KR | 10-2010-0010810 | 2/2010 |
| KR | 10-2012-0055983 | 6/2012 |
| KR | 10-2013-0048626 | 5/2013 |

\* cited by examiner

*Primary Examiner* — Bilkis Jahan
(74) *Attorney, Agent, or Firm* — Innovation Counsel LLP

(57) ABSTRACT

There is provided a liquid crystal display including a first insulation substrate, a gate line and a data line that are positioned to cross each other on the first insulation substrate, a thin film transistor including a gate electrode connected to the gate line, a semiconductor layer positioned to overlap the gate electrode, and source and drain electrodes connected to the semiconductor layer, a pixel electrode connected to the thin film transistor, a second insulation substrate facing the first insulation substrate, a light blocking member disposed on the second insulation substrate, a common electrode disposed on the planarization layer, and a short-circuiting prevention insulating layer disposed on the common electrode in a region corresponding to a repair region.

20 Claims, 4 Drawing Sheets

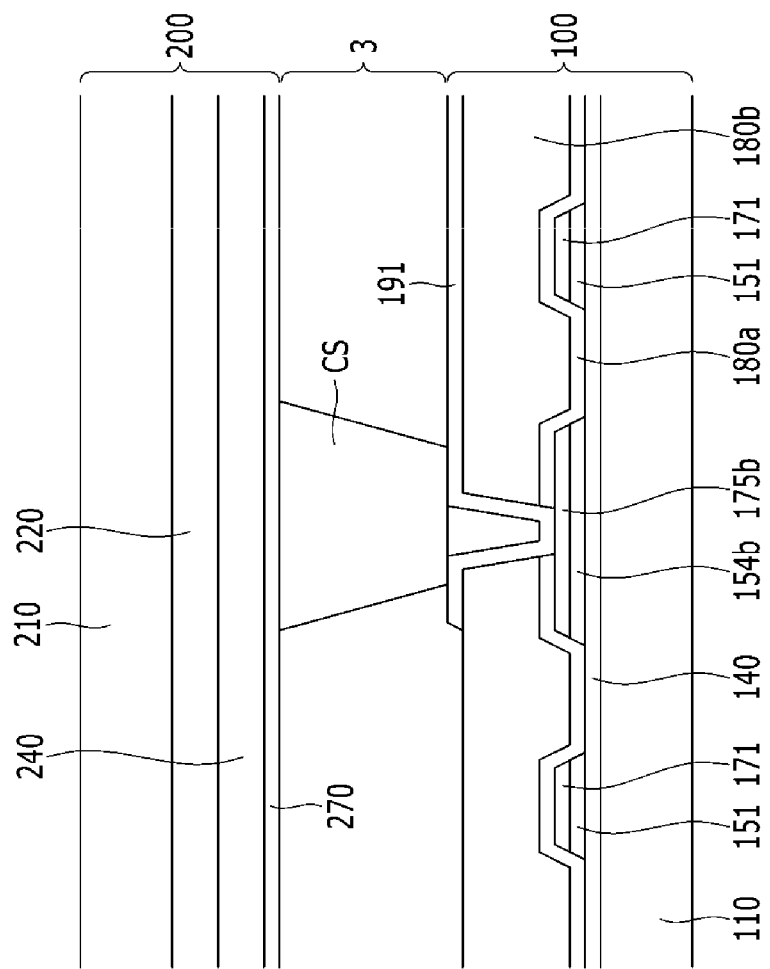

LIQUID CRYSTAL DISPLAY

CROSS-REFERENCE TO RELATED APPLICATION

This application claims priority to and the benefit of Korean Patent Application No. 10-2015-0002979 filed in the Korean Intellectual Property Office on Jan. 8, 2015, the entire contents of which are incorporated herein by reference.

BACKGROUND (a) Field

The present inventive concept relates to a liquid crystal display.

(b) Description of the Related Art

A liquid crystal display is one of flat panel displays that have been most widely used, includes two substrates on which electrodes are formed, respectively, and a liquid crystal layer inserted into the substrate, and adjusts the amount of light passing through the liquid crystal by applying signals to the electrodes to rearrange liquid crystal molecules of the liquid crystal layer.

A thin film transistor (TFT) substrate as one of the two substrates included in liquid crystal display is used for independently driving each pixel in a liquid crystal display or an organic light emitting diode (OLED).

A liquid crystal display includes a gate line for transmitting a gate signal and a data line for transmitting a data signal, which are formed to cross each other on the thin film transistor substrate, a thin film transistor connected to the gate line and the data line, and a pixel electrode connected to the thin film transistor.

When wirings of the liquid crystal display are undesirably disconnected or short-circuited, a corresponding pixel is determined to be a defective pixel and needs to be repaired. Pixel repair includes short-circuit or disconnection processes using a laser, and in this case metal debris may be generated. The metal debris causes short-circuit between a common electrode and a pixel electrode or a common electrode and a data line which degrades image quality.

The above information disclosed in this Background section is only for enhancement of understanding of the background of the inventive concept and therefore it may contain information that does not form the prior art that is already known in this country to a person of ordinary skill in the art.

SUMMARY

The present inventive concept has been made in an effort to provide a liquid crystal display having advantages of minimizing short circuit due to impurity generated from a laser process.

An exemplary embodiment of the present inventive concept provides liquid crystal display including a first insulation substrate, a gate line and a data line that are positioned to cross each other on the first insulation substrate, a thin film transistor including a gate electrode connected to the gate line, a semiconductor layer positioned to overlap the gate electrode, and source and drain electrodes connected to the semiconductor layer, a pixel electrode connected to the thin film transistor, a second insulation substrate facing the first insulation substrate, a light blocking member disposed on the second insulation substrate, and a common electrode disposed on the light blocking member, and a short-circuiting prevention insulating layer disposed on the common electrode in a region corresponding to a repair region.

The repair region may include any one of a first region in which a data line and a first source electrode are connected, a second region in which a first drain electrode and a first subpixel electrode are connected, and a third region in which a second drain electrode and a second subpixel electrode are connected.

The light blocking member may include a recess portion formed in a region corresponding to the repair region.

The recess portion may have a depth equal to or more than 0.2 μm.

The liquid crystal display may further include a planarization layer formed on the light blocking member.

The liquid crystal display may further include a planarization layer formed on the light blocking member The recess portion may include a light blocking member, a planarization layer, a common electrode, and a short-circuiting prevention insulating layer that are sequentially positioned below a second insulation substrate.

A thickness of a planarization layer positioned in the recess portion may be thicker than a planarization layer disposed in a region other than the recess portion.

A region other than the recess portion may not include a short-circuiting prevention insulating layer.

The short-circuiting prevention insulating layer may be formed of an insulating material.

The short-circuiting prevention insulating layer may be formed to a thickness between about 0.03 μm and about 1 μm.

The liquid crystal display may further include a column spacer disposed in a region other than the recess portion for maintaining a cell gap between the first insulation substrate and the second insulation substrate on the second insulation substrate.

The short-circuiting prevention insulating layer may be formed of the same material as the column spacer.

The short-circuiting prevention insulating layer may be formed of an organic material.

An exemplary embodiment of the present inventive concept provides liquid crystal display including a first insulation substrate, a gate line and a data line that are positioned to cross each other on the first insulation substrate, a thin film transistor including a gate electrode connected to the gate line, a semiconductor layer positioned to overlap the gate electrode, and source and drain electrodes connected to the semiconductor layer, a pixel electrode connected to the thin film transistor, a second insulation substrate facing the first insulation substrate, a light blocking member disposed on the second insulation substrate, a common electrode disposed on the light blocking member. The light blocking member may include a recess portion formed in a region corresponding to a repair region of an electrode included in the thin film transistor.

The liquid crystal display may further include a short-circuiting prevention insulating layer disposed on the common electrode in a region corresponding to the repair region.

A height of the surface of the short-circuiting prevention insulating layer may be equal to or higher that of the pixel electrode.

It is to be understood that both the foregoing general description and the following detailed description of the present inventive concept are exemplary and explanatory and are intended to provide further explanation of the inventive concept as claimed.

According to the aforementioned exemplary embodiment of the present inventive concept, the following effects may be achieved.

According to an embodiment of the present inventive concept, a recess portion including a short-circuiting prevention insulating layer may be formed on a second insulation substrate that overlaps a repair region so as to prevent a common electrode and a pixel electrode from being short circuited due to impurities, thereby minimizing potential distortion.

According to an embodiment of the present inventive concept, a recess portion may be formed at a higher level than a region other than the recess portion based on a first insulation substrate, thereby preventing a pixel electrode and a common electrode from being short-circuited due to metal debris.

According to an embodiment of the present inventive concept, a liquid crystal display may be configured in such a way that a short-circuiting insulating layer included in a recess portion may be formed of the same material via the same manufacturing process as a column spacer, thereby reducing manufacturing costs.

In addition, according to exemplary embodiments of the present inventive concept, other features and advantages may be newly recognized.

BRIEF DESCRIPTION OF THE DRAWINGS

FIG. 4 is a cross-sectional view taken along a line IV-IV of FIG. 1.

DETAILED DESCRIPTION OF THE EMBODIMENTS

Figure 1:
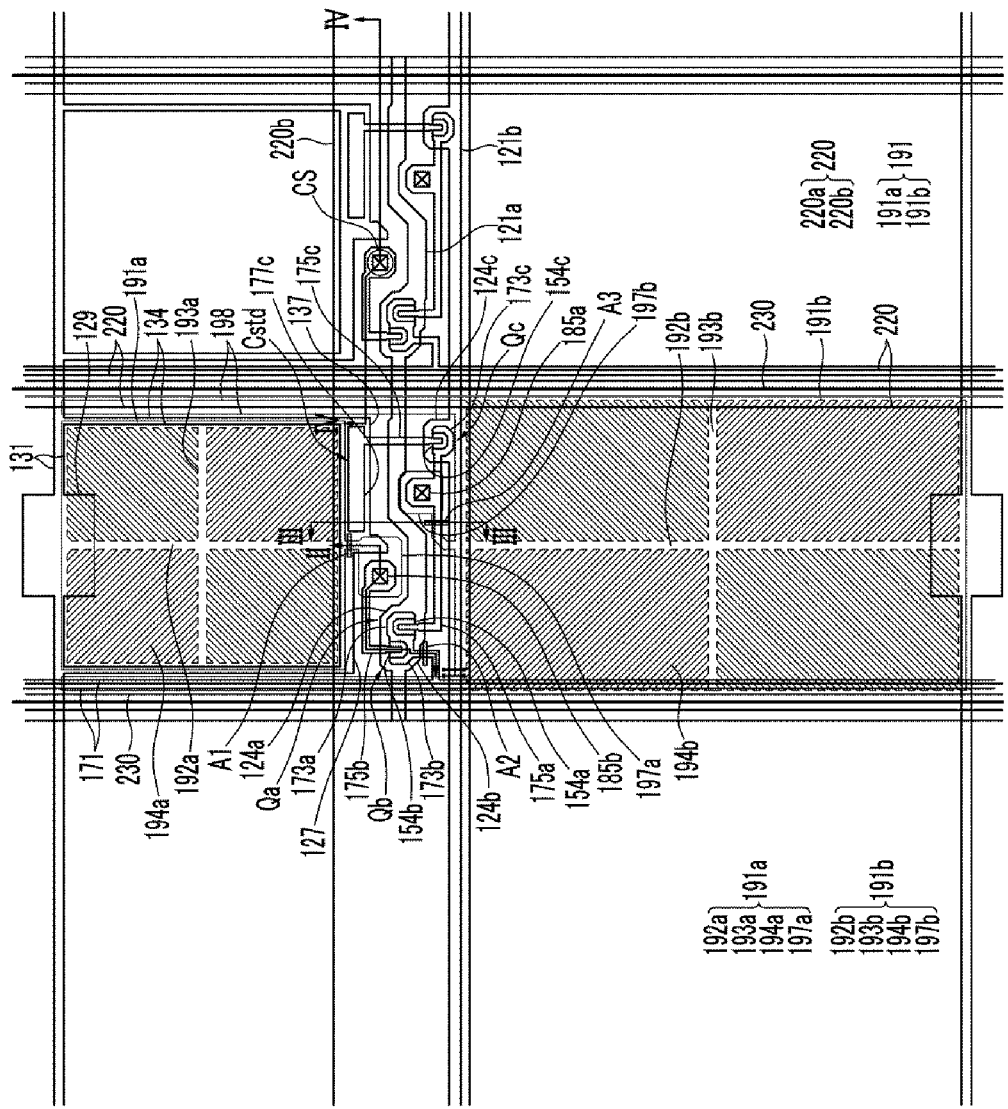
FIG. 1 is a top plan view of liquid crystal display according to an exemplary embodiment of the present inventive concept.

Hereinafter, the present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. When an element, such as a layer, a region, or a substrate, is referred to as being "on", "connected to" or "coupled to" another element, it may be directly on, connected or coupled to the other element or intervening elements may be present between the element and the another element. In contrast, when an element is referred to as being "directly on," "directly connected to" or "directly coupled to" another element or layer, there are no intervening elements or layers present.

Hereinafter, a liquid crystal display according to an exemplary embodiment of the present inventive concept will be described in detail with reference to the attached drawings.

Figure 2:
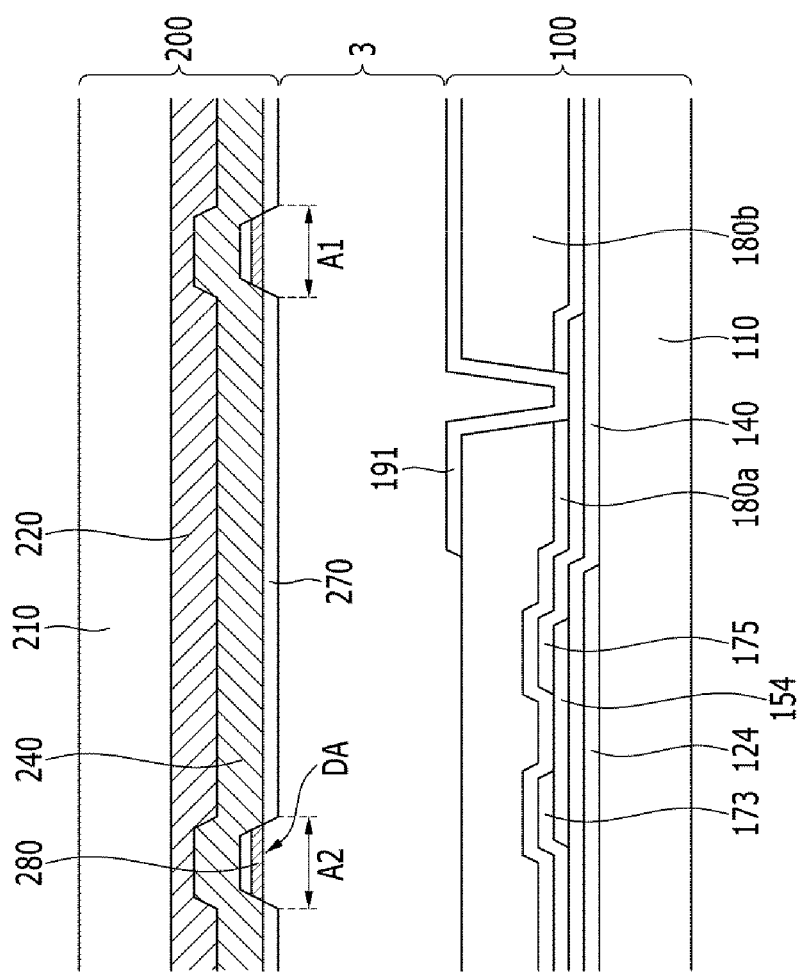
FIG. 2 is a cross-sectional view taken along a line II-II of FIG. 1.
Figure 3:
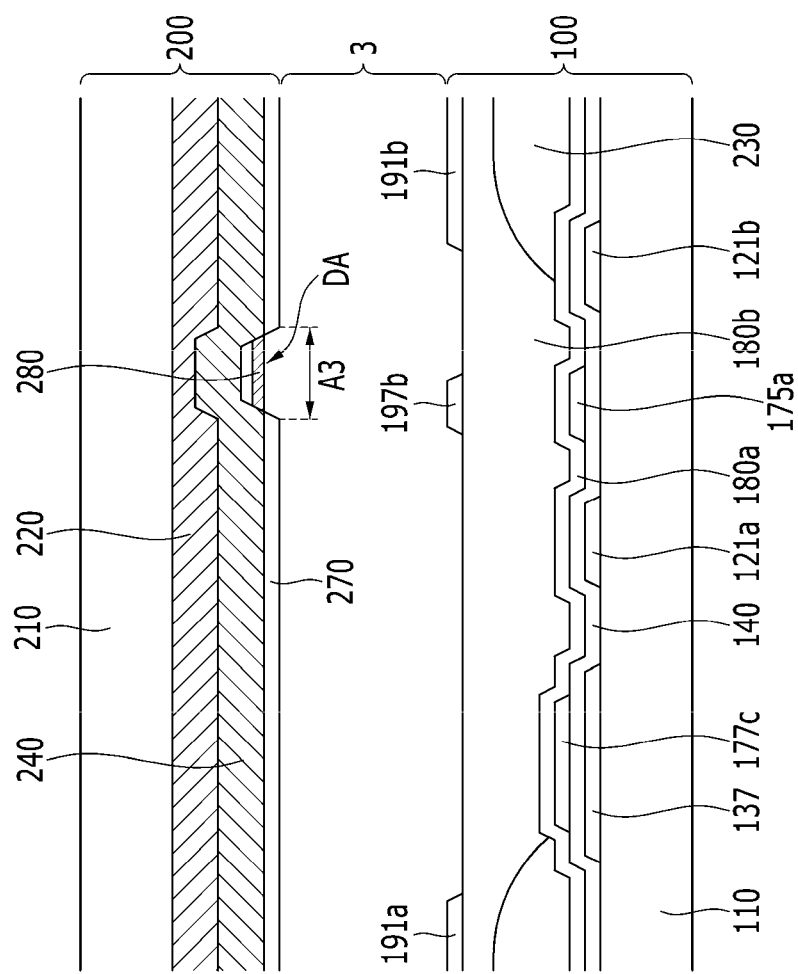
FIG. 3 is a cross-sectional view taken along a line III-III of FIG. 1.

FIG. 1 is a top plan view of liquid crystal display according to an exemplary embodiment of the present inventive concept, FIG. 2 is a cross-sectional view taken along a line II-II of FIG. 1, FIG. 3 is a cross-sectional view taken along a line III-III of FIG. 1, and FIG. 4 is a cross-sectional view taken along a line IV-IV of FIG. 1.

Referring to FIGS. 1 to 4, the liquid crystal display according to an exemplary embodiment of the present inventive concept includes a lower display panel 100 and an upper display panel 200 that face each other, and a liquid crystal layer 3 interposed between the two display panels.

First, the lower display panel 100 will be described below.

A plurality of gate lines including a first gate line 121a and a second gate line 121b and a plurality of gate conductors including a plurality of storage electrode lines 131 are formed on a first insulation substrate 110 including a pixel area.

The gate lines 121a and 121b mainly extend in a horizontal direction and transmit a gate signal. The first gate line 121a includes a first gate electrode 124a and a second gate electrode 124b that protrude upward and downward, and the second gate line 121b includes a third gate electrode 124c that protrudes upward. The first gate electrode 124a and the second gate electrode 124b are connected to each other to constitute one protrusion.

A storage electrode line 131 also mainly extends in a horizontal direction and transmits a predetermined voltage such as a common voltage Vcom. The storage electrode line 131 includes a storage electrode 129 that protrude upward and downward, a pair of vertical portions 134 that extend downward to be substantially perpendicular to the gate lines 121a and 121b, and a horizontal portion 127 for connecting ends of the pair of vertical portions 134 to each other. The horizontal portion 127 includes a capacitor electrode 137 that extends downward.

A gate insulating layer 140 is formed on gate conductors 121a, 121b, and 131.

A plurality of semiconductor stripes 151 are formed of amorphous or crystalline silicon on the gate insulating layer 140. A semiconductor stripe mainly extends in a vertical direction and includes first and second semiconductors 154a and 154b that extend toward first and second gate electrodes 124a and 124b and are connected to each other, and a third semiconductor 154c positioned on the third gate electrode 124c.

A plurality of pairs of ohmic contacts (not shown) are formed on the semiconductors 154a, 154b, and 154c. The ohmic contact may be formed of a material such as silicide or n+ hydrogenated amorphous silicon doped with high concentration of n-type impurity.

A data conductor including a plurality of data lines 171, a plurality of first drain electrodes 175a, a plurality of second drain electrodes 175b, and a plurality of third drain electrodes 175c is formed on the ohmic contact.

The data lines 171 transmit a data signal and mainly extend in a vertical direction to cross the gate lines 121a and 121b. Each of the data lines 171 includes a first source electrode 173a and a second source electrode 173b that extend toward the first gate electrode 124a and the second gate electrode 124b and are connected to each other.

A first drain electrode 175a, a second drain electrode 175b, and a third drain electrode 175c include one wide end portion and the other end portion with a rod shape. The rod type other end portion of each of the first drain electrode 175a and the second drain electrode 175b is partially surrounded by the first source electrode 173a and the second source electrode 173b. The wide one end portion of the first drain electrode 175a extends to constitute the third source electrode 173c with a curved shape of 'U'. A wide end portion 177c of a third drain electrode 175c overlaps the capacitor electrode 137 to form a step-down capacitor Cstd and the rod type end portion is partially surrounded by the third source electrode 173c.

The first gate electrode 124a, the first source electrode 173a, and the first drain electrode 175a form a first thin film transistor Qa together with the first semiconductor 154a, the second gate electrode 124b, the second source electrode 173b, and the second drain electrode 175b form a second thin film transistor Qb together with the second semiconductor 154b, the third gate electrode 124c, the third source electrode 173c, and the third drain electrode 175c form a third thin film transistor Qc together with the third semiconductor 154c.

A semiconductor stripe including the first semiconductor 154a, the second semiconductor 154b, and the third semiconductor 154c may have substantially the same planar shape as data conductors 171, 173a, 173b, 173c, 175a, 175b, and 175c and ohmic contacts disposed therebelow except for a channel region between source electrodes 173a, 173b, and 173c and drain electrodes 175a, 175b, and 175c.

The first semiconductor 154a has an exposed portion that is not covered by the first source electrode 173a and the first drain electrode 175a between the first source electrode 173a and the first drain electrode 175a, the second semiconductor 154b has an exposed portion that is not covered by the second source electrode 173b and the second drain electrode 175b between the second source electrode 173b and the second drain electrode 175b, and the third semiconductor 154c has an exposed portion that is not covered by the third source electrode 173c and the third drain electrode 175c between the third source electrode 173c and the third drain electrode 175c.

A passivation layer 180a formed of an inorganic insulator such as silicon nitride or silicon oxide is formed on the data conductors 171, 173a, 173b, 173c, 175a, 175b, and 175c and the exposed portions of the semiconductors 154a, 154b, and 154c.

A plurality of color filters 230 are formed on the passivation layer 180a. The plurality of color filters 230 include a red color filter, a green color filter, and a blue color filter that are arranged in parallel to each other. The plurality of color filters 230 are formed in parallel to each other in a horizontal direction, or alternatively, may be formed in a stripe form in a vertical direction.

A second passivation layer 180b may be positioned on the plurality of color filters 230. The second passivation layer 180b may be formed as an organic layer or an inorganic layer. According to another exemplary embodiment of the present inventive concept, the second passivation layer 180b may be omitted.

A pixel electrode 191 including a first subpixel electrode 191a and a second subpixel electrode 191b is formed on the second passivation layer 180b. The first subpixel electrode 191a and a second subpixel electrode 191b are separated from each other across the first gate line 121a and the second gate line 121b and are disposed above and below the first gate line 121a and the second gate line 121b to be adjacent to each other in a column direction, respectively. An area of the second subpixel electrode 191b may be greater than an area of the first subpixel electrode 191a and may be about 1 to 3 times the area of the first subpixel electrode 191a.

An overall shape of each of the first subpixel electrode 191a and the second subpixel electrode 191b is a quadrangle, and each of the first subpixel electrode 191a and the second subpixel electrode 191b includes a cross stem portion including horizontal stem portions 193a and 193b, and vertical stem portions 192a and 192b that cross the horizontal stem portions 193a and 193b. In addition, each of the first subpixel electrode 191a and the second subpixel electrode 191b includes a plurality of fine branch portions 194a and 194b. The first subpixel electrode 191a includes a lower protrusion 197a and the second subpixel electrode 191b includes an upper protrusion 197b.

The first subpixel electrode 191a and the second subpixel electrode 191b are divided into four subregions by the horizontal stem portions 193a and 193b and the vertical stem portions 192a and 192b, respectively. The fine branch portions 194a and 194b may diagonally extend from the horizontal stem portions 193a and 193b and the vertical stem portions 192a and 192b, and an inclination direction may make an angle of about 45 or 135 degrees with respect to the gate lines 121a and 121b or the horizontal stem portions 193a and 193b. In addition, the fine branch portions 194a and 194b of two neighboring subregions may be perpendicular to each other.

According to the present exemplary embodiment, the first subpixel electrode 191a further includes a contour branch portion surrounding a contour thereof, and the second subpixel electrode 191b further includes upper and lower horizontal portions and right and left vertical portions 198 positioned on the right and left of the first subpixel electrode 191a. The right and left vertical portions 198 may prevent capacitive-coupling between the data lines 171 and the first subpixel electrode 191a. The right and left vertical portions 198 may be omitted.

A plurality of first contact holes 185a and a plurality of second contact holes 185b through which the wide end portion of the first drain electrode 175a and the wide end portion of the second drain electrode 175b are exposed, respectively, are formed on the first passivation layer 180a, a color filter 230, and the second passivation layer 180b. The first contact hole 185a may connect the second subpixel electrode 191b and the third drain electrode 175c to each other, and the second contact hole 185b may connect the first subpixel electrode 191a and the second drain electrode 175b.

In this case, wirings and electrodes included in the lower display panel 100 may include fine lines with a width of several to several tens of μm. Accordingly, during manufacturing of the lower display panel 100, wirings and electrodes with a fine line width may be disconnected. When wirings and electrodes with a fine line width are disconnected, a corresponding pixel is determined as a defective pixel and needs to be repaired.

In the case of a defective pixel, a repair process for disconnecting an electrode included in a thin film transistor using a laser is performed in the manufacturing method. In this case, the repair process is performed in repair regions A1, A2, and A3 including any one of a first region A1 in which the first pixel electrode 191a is connected, a second region A2 in which the data line 171 and the second source electrode 173b are connected, and a third region A3 in which the first drain electrode 175a and the first contact hole 185a are connected.

That is, in the case of a defective first subpixel, the first pixel electrode 191a positioned in the first region A1 may be disconnected using a laser so as to block a data voltage transmitted to the first pixel electrode 191a. A line connecting the data line 171 and the second source electrode 173b may be disconnected using a laser so as to block a data voltage transmitted to the pixel electrode 191a and 191b. A line connecting the first drain electrode 175a and the first contact hole 185a may be disconnected using a laser so as to block a data voltage transmitted to the second subpixel electrode 191b using a laser so as to effectively block a data voltage transmitted to the second subpixel electrode 191b.

A separate reference number is not denoted to a repair region, but for convenience of description, the first region A1, the second region A2, and the third region A3 are collectively referred to as the repair regions A1, A2, and A3.

According to an exemplary embodiment of the present inventive concept, the repair region may include a region in which wirings and electrodes are disconnected. The first region A1, the second region A2, and the third region A3 are only examples of the repair region.

Hereinafter, the upper display panel 200 will be described.

The upper display panel 200 is configured in such a way that a light blocking member 220 is positioned on a transparent second insulation substrate 210. The light blocking member 220 is used to prevent light leakage and is formed to correspond to upper portions of the gate line 121, the data lines 171, the storage electrode line 131, and the thin film transistor.

The light blocking member 220 may be positioned between pixels that are adjacent to each other in a row direction or between pixels that are adjacent to each other in a column direction. That is, the light blocking member 220 may be positioned in a direction in which a gate line or a data line of a thin film transistor extends.

A planarization layer 240 may be disposed on the light blocking member 220.

The planarization layer 240 may be formed of an organic or inorganic material, particularly, an organic material with excellent planarization characteristic, for example, benzocyclobutene (BCB) and acryl resin.

A common electrode 270 is formed on the planarization layer 240.

The common electrode 270 is formed of transparent metal such as indium tin oxide (ITO) or indium zinc oxide (IZO) and transmits a common voltage.

A column spacer (CS) may be formed on the common electrode 270.

The column spacer CS may be positioned in a region in which the light blocking member 220 is formed.

Particularly, the column spacer CS may be formed in a region other than a recess portion DA.

The column spacer CS is formed to protrude from the common electrode 270 with a shape such as an approximate cylinder, truncated circular cone and hemisphere on the second insulation substrate 210 and maintains an interval with the first insulation substrate 110.

The column spacer CS may be formed of a material with elastic force, such as thermoset resin, for example, acryl.

An upper alignment layer (not shown) may be formed on the common electrode 270.

In this case, the upper display panel 200 includes the recess portion DA.

The recess portion DA may be formed on the second insulation substrate 210 to overlap the repair regions A1, A2, and A3.

A distance between the first substrate 110 and the recess portion DA may be longer than that between the first substrate 110 and a region other than the recess portion DA.

In this case, in the case of defective pixel, when any one of the source electrode 173, the drain electrode 175, and the pixel electrode 191 positioned in the repair regions A1, A2, and A3 is disconnected using a laser, metal debris may be generated. The metal debris may be separated from a conductor, and thus the common electrode 270 and the pixel electrode 191 are short-circuited to degrade image quality.

That is, according to an exemplary embodiment of the present inventive concept, the distance between the first insulation substrate 110 and the recess portion DA may be longer than that between the first insulation substrate 110 and a region other than the recess portion DA so as to prevent the pixel electrode 191 and the common electrode 270 from being short-circuited due to metal debris, thereby minimizing potential distortion.

The recess portion DA may be formed in the light blocking member 220 to have a depth of the recess to be about 0.2 μm or more.

The recess portion DA may include the light blocking member 220, the planarization layer 240, the common electrode 270, and a short-circuiting prevention insulating layer 280 that are formed on the second insulation substrate 210.

To increase the distance between the first insulation substrate 110 and the recess portion DA, the light blocking member 220 positioned in the recess portion DA may be formed with a smaller thickness than that of the light blocking member 220 positioned in a region other than the recess portion DA.

In addition, in order to increase the distance between the first insulation substrate 110 and the recess portion DA, the planarization layer 240 positioned in the recess portion DA may be thicker than that of the planarization layer 240 positioned in a region other than the recess portion DA.

The recess portion DA may include the short-circuiting prevention insulating layer 280. The short-circuiting prevention insulating layer 280 may be formed of an insulating material in order to prevent the pixel electrode 191 and the common electrode 270 from being short-circuited.

In addition, the short-circuiting prevention insulating layer 280 may be formed of the same material via the same manufacturing process as the column spacer CS. The short-circuiting prevention insulating layer 280 may be formed of an organic material such as acryl.

In addition, the short-circuiting prevention insulating layer 280 may prevent the pixel electrode 191 and the common electrode 270 from being short-circuited and may be formed to a thickness between 300 Å and 1 μm in order to maintain a predetermined distance to the recess portion DA from the first insulation substrate 110.

A liquid crystal display according to an exemplary embodiment of the present Inventive concept may be configured in such a way that the short-circuiting prevention insulating layer 280 included in the recess portion DA is formed of the same material via the same manufacturing process as the column spacer CS, thereby reducing manufacturing costs.

The liquid crystal layer 3 has negative dielectric anisotropy, and liquid crystal molecules of the liquid crystal layer 3 are aligned such that a major axis of the liquid crystal molecules are perpendicular to surfaces of the two display panels 100 and 200 in a state in which an electric field is not present. The liquid crystal layer 3 may include an aligning aid agent including reactive mesogen such that major axis of liquid crystal molecules may have a pretilt in approximately parallel to a length direction of the fine branch portions 194a and 194b of the pixel electrode 191. The aligning aid agent may be included in an alignment layer instead of a liquid crystal layer.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A liquid crystal display comprising:
   a first insulation substrate;
   a gate line and a data line that are positioned to cross each other on the first insulation substrate;
   a thin film transistor including a gate electrode connected to the gate line, a semiconductor layer positioned to overlap the gate electrode, and source and drain electrodes connected to the semiconductor layer;
   a pixel electrode connected to the thin film transistor;
   a second insulation substrate facing the first insulation substrate;
   a light blocking member disposed on the second insulation substrate;
   a common electrode disposed on the light blocking member; and a short-circuiting prevention insulating layer disposed on the common electrode in a region corresponding to a repair region.

2. The liquid crystal display of claim 1, wherein:
the repair region includes any one of a first region in which a data line and a first source electrode are connected, a second region in which a first drain electrode and a first subpixel electrode are connected, and a third region in which a second drain electrode and a second subpixel electrode are connected.

3. The liquid crystal display of claim 1, wherein:
the light blocking member includes a recess portion formed in a region corresponding to the repair region.

4. The liquid crystal display of claim 1, wherein:
the recess portion has a depth equal to or more than 0.2 μm.

5. The liquid crystal display of claim 4, further comprising:
a planarization layer formed on the light blocking member.

6. The liquid crystal display of claim 5, wherein:
the recess portion includes a light blocking member, a planarization layer, a common electrode, and a short-circuiting prevention insulating layer that are sequentially positioned below a second insulation substrate.

7. The liquid crystal display of claim 6, wherein:
a thickness of a planarization layer positioned in the recess portion is thicker than a planarization layer disposed in a region other than the recess portion.

8. The liquid crystal display of claim 6, wherein:
a region other than the recess portion does not include a short-circuiting prevention insulating layer.

9. The liquid crystal display of claim 8, wherein:
the short-circuiting prevention insulating layer is formed of an insulating material.

10. The liquid crystal display of claim 8, wherein:
the short-circuiting prevention insulating layer is formed to a thickness between about 0.03 μm and about 1 μm.

11. The liquid crystal display of claim 10, further comprising a column spacer disposed in a region other than the recess portion.

12. The liquid crystal display of claim 11, wherein:
the short-circuiting prevention insulating layer is formed of the same material as the column spacer.

13. The liquid crystal display of claim 12, wherein:
the short-circuiting prevention insulating layer is formed of an organic material.

14. A liquid crystal display comprising:
a first insulation substrate;
a gate line and a data line that are positioned to cross each other on the first insulation substrate;
a thin film transistor including a gate electrode connected to the gate line, a semiconductor layer positioned to overlap the gate electrode, and source and drain electrodes connected to the semiconductor layer;
a pixel electrode connected to the thin film transistor;
a second insulation substrate facing the first insulation substrate;
a light blocking member disposed on the second insulation substrate;
a common electrode disposed on the light blocking member,
wherein the light blocking member includes a recess portion formed in a region corresponding to a repair region of an electrode included in the thin film transistor.

15. The liquid crystal display of claim 14, further comprising:
a short-circuiting prevention insulating layer disposed on the common electrode in a region corresponding to the repair region.

16. The liquid crystal display of claim 15, wherein:
the recess portion has a depth equal to or more than 0.2 μm.

17. The liquid crystal display of claim 16, wherein a height of the surface of the short-circuiting prevention insulating layer is equal to or higher than that of the pixel electrode.

18. The liquid crystal display of claim 17, wherein the short-circuiting prevention insulating layer is formed of the same material as a column spacer.

19. The liquid crystal display of claim 18, wherein the short-circuiting prevention insulating layer is formed to a thickness between about 0.03 μm and about 1 μm.

20. The liquid crystal display of claim 15, wherein the short-circuiting prevention insulating layer is formed of the same material as a column spacer.

* * * * *